United States Patent [19]
Kobayashi et al.

[11] Patent Number: 4,935,314
[45] Date of Patent: Jun. 19, 1990

[54] FERROMAGNETIC FILM AND MAGNETIC HEAD USING THE SAME

[75] Inventors: Toshio Kobayashi, Tokyo; Ryoichi Nakatani, Akigawa; Shigekazu Otomo, Sayama; Noriyuki Kumasaka, Ome, all of Japan

[73] Assignee: Hitachi, Ltd., Tokyo, Japan

[21] Appl. No.: 172,499

[22] Filed: Mar. 24, 1988

[30] Foreign Application Priority Data

Mar. 25, 1987 [JP] Japan .................................. 62-68820

[51] Int. Cl.⁵ .............................................. G11B 5/66
[52] U.S. Cl. .................................... 428/694; 428/704; 428/900; 369/288
[58] Field of Search ........................ 428/694, 900, 928

[56] References Cited

U.S. PATENT DOCUMENTS 4,769,282  9/1988  Tada et al. ........................... 428/900
4,814,238  3/1989  Tanaka et al. ....................... 428/692

FOREIGN PATENT DOCUMENTS 0087245  9/1984  Japan .
0132254  of 1987. Japan .

Primary Examiner—George F. Lesmes
Assistant Examiner—Dennis Carmen
Attorney, Agent, or Firm—Antonelli, Terry, Stout & Kraus

[57] ABSTRACT

An anti-corrosion ferromagnetic film and a magnetic head using the crystalline ferromagnetic film are disclosed. The anti-corrosion film contains an element interstitially soluble to iron, in addition to iron used as the main component, and further contains at least one element selected from the group consisting of Ni, Rh, Ru, Pd, Zr, Nb, Ta, Ag, Os, Ir, Pt, Au, Cr, Mo, W, Ti, Bi, V, Co and Cu, at a concentration value of 0.5 to 5 atomic percent.

7 Claims, 2 Drawing Sheets

FERROMAGNETIC FILM AND MAGNETIC HEAD USING THE SAME

BACKGROUND OF THE INVENTION

The present invention relates to the core material of a magnetic head used in a magnetic disk apparatus or video tape recorder. More particularly, the invention relates to a ferromagnetic film having high saturation magnetic flux density, high permeability, a low magnetostriction constant and high corrosion resistance, and a magnetic head using the ferromagnetic film.

The magnetic recording technology has made remarkable progress in recent years, and the recording density in magnetic recording is now being increased to make a home video tape recorder small in size and weight, and to increase the storage capacity of a magnetic disk. In order to increase the recording density, a ferromagnetic film used in a magnetic head is required to have high saturation magnetic flux density so that a high density recording operation can be performed for a recording medium having high coercivity.

Further, the material of a ferromagnetic film used in a magnetic head is required to have high permeability to improve the recording/reproducing efficiency. In order to keep the recording/reproducing efficiency stable, it is preferable that the above material have a magnetostriction constant nearly equal to zero.

As a magnetic material having such magnetic characteristics, an Fe-Al-Si alloy (the so-called "sendust") disclosed in JP-A-60-74,110 and an Fe-Si alloy disclosed in JP-A-52-112,797 (corresponding to U.S. application Ser. No. 662,198 filed on Feb. 26, 1976 and assigned to IBM) and JP-A-59-182,938, have been developed. Each of these alloys contains iron as its main component, and has a high saturation magnetic flux density. These alloys can be used as a magnetic head material.

However, the Fe-Al-Si alloy has a relatively low saturation magnetic flux density of about 10 KG. Further, the Fe-Si alloy has a high saturation magnetic flux density of 18 KG, but is low in corrosion resistance. When ruthenium (Ru) or the like is added to the Fe-Si alloy to improve the corrosion resistance, the saturation magnetic flux density of the Fe-Si alloy is reduced to about 14 KG.

SUMMARY OF THE INVENTION

It is an object of the present invention to provide a ferromagnetic film which can eliminate the above drawbacks of the prior art and has high saturation magnetic flux density, high permeability, a low magnetostriction constant and high corrosion resistance, to be used as the core material of a magnetic head, and to provide a magnetic head using the ferromagnetic film.

According to one aspect of the present invention, at least one element selected from the group consisting of Ni, Rh, Ru, Pd, Zr, Nb, Ta, Ag, Os, Ir, Pt, Au, Cr, Mo, W, Ti, Bi, V, Co and Cu is added to a ferromagnetic film which contains an element interstitially soluble to iron in addition to iron used as the main component to have high saturation magnetic flux density and high permeability, at a concentration value of 0.5 to 5 atomic percent, to improve the corrosion resistance of the ferromagnetic film and decrease the absolute value of the magnetostriction constant thereof without degrading the magnetic characteristics of the ferromagnetic film.

Preferably, at least one element selected from the group consisting of B, N, C and P is used as the element interstitially soluble to iron. Further, when a main magnetic film which is the above ferromagnetic film, and a metal film are alternately laminated so as to form a multi-layered film, the permeability of the multi-layered film will be greatly increased.

The present inventors have extensively studied a magnetic film which contains iron as its main component and has high saturation magnetic flux density, and have found that when an element interstitially soluble to iron is added to the magnetic film, the permeability of the magnetic film is increased and the coercivity thereof is reduced without reducing the saturation magnetic flux density of the magnetic film (refer to U.S. application Ser. No. 56,114 filed by the present inventors on June 1, 1987 and assigned to the present assignee). As mentioned above, when an element interstitially soluble to iron is added to a magnetic film containing iron as its main component, the soft magnetic characteristics of the magnetic film are improved. The reason for this is not clear. However, when a magnetic film containing iron as its main component further contains an element interstitially soluble to iron, the X-ray diffraction line of the magnetic film becomes broad, and an electron microscope image of the magnetic film shows that crystal grains contained in the magnetic film are smaller in size than those contained in a magnetic film which is not added with an element interstitially soluble to iron. Thus, it is supposed that the addition of an element interstitially soluble to iron to a magnetic film makes the magnetocrystalline anisotropy constant small or decreases the dispersion of magnetic anisotropy, and hence improves the soft magnetic characteristics of the magnetic film. Further, even when an element interstitially soluble to iron is added to the magnetic film at a concentration value of 10 to 20 atomic percent, almost no reduction of the saturation magnetic flux density of the magnetic film takes place, which is a characteristic of an interstitially soluble element. The number of iron atoms contained in a unit volume is kept unchanged, since the element is solved interstitially in the Fe lattice and this is supposed to be an advantageous effect.

The inventors' study has shown that when at least one element selected from the group consisting of Ni, Rh, Ru, Pd, Zr, Nb, Ta, Ag, Os, Ir, Pt, Au, Cr, Mo, W, Ti, Bi, V, Co and Cu is added to a magnetic film which contains an element interstitially soluble to iron in addition to iron used as the main component, the corrosion resistance of the magnetic film can be greatly improved without degrading the soft magnetic characteristics of the magnetic film Further, it has been found that the corrosion resistance of the magnetic film increases as the amount of the element added to the magnetic film for the purpose of improving the corrosion resistance thereof is larger. However, when the amount of the above element is increased, the magnetostriction constant of the magnetic film changes from a negative value to a positive value. In order to form a magnetic film which has a magnetostriction constant whose absolute value is very small, and is excellent in corrosion resistance, it is preferred to add an element for improving corrosion resistance to the magnetic film at a concentration value of 0.5 to 5 atomic percent.

Further, it has been found that when an element interstitially soluble to iron is added to a magnetic film which contains iron as it main component, the magnetostriction constant of the magnetic film is increased. Accordingly, in order to form a magnetic film which has a magnetostriction constant nearly equal to zero and is excellent in soft magnetic characteristics and corrosion resistance, it is preferred that the magnetic film contains an element interstitially soluble to iron at a concentration value of 1 to 15 atomic percent and an element for improving corrosion resistance at a concentration value of 0.5 to 5 atomic percent.

Further, the inventors' study has shown that in a case where a main magnetic film which is the above magnetic film, and a metal film are alternately laminated so as to form a multi-layered film having predetermined thickness, the permeability of the multi-layered film increases and the coercivity thereof decreases as the number of layers included in the multi-layered film is larger, that is, the thickness of each main magnetic film is smaller. It is supposed that an improvement in soft magnetic characteristics due to a multi-layered structure is based upon the restriction of crystal grain growth due to the multi-layered structure, which induces a decrease in the dispersion of magnetic anisotropy.

DESCRIPTION OF THE PREFERRED EMBODIMENTS

The present invention will be explained below in detail in connection with the following examples

EXAMPLE 1

A magnetic film containing iron as its main component was formed by the ion beam sputtering method. The ion beam sputtering apparatus used in Example 1 was a dual ion beam apparatus provided with two ion guns, one of which performs a sputtering operation for a target to deposit sputtered particles on a substrate. The other ion gun is used for bombarding the substrate with emitted ions. In more detail, the other ion gun emits ions having an energy not greater than 500 eV, and the substrate is bombarded with such low energy ions to control the structure of a film deposited on the substrate.

The sputtering conditions for forming a magnetic film which has high saturation magnetic flux density, high permeability, a small magnetostriction constant and high corrosion resistance were studied and determined as follows:

| | |
|---|---|
| Ion accelerating voltage of the first ion gun | 1,000 to 1,400 V. |
| Ion accelerating voltage of the second ion gun | 200 to 400 V. |
| Ar pressure | 2 to 3 × 10$^{-2}$ Pa. |
| Temperature of the substrate surface | 50 to 100° C. |
| Rotation rate of the substrate | 20 to 60 RPM. |

Under the above sputtering conditions, various magnetic films containing iron as their main component and containing carbon as the interstitially soluble element were deposited on a glass substrate to a thickness of 0.5 to 1 μm, using iron targets which were fixedly loaded with various materials shown in Table 1. The composition of each of the magnetic films thus obtained was determined by the inductively coupled argon plasma spectroscopy and Auger electron spectroscopy. The magnetic films were subjected to heat treatment at 300° C. Then, the saturation magnetic flux density, permeability, coercivity and magnetostriction constant of each magnetic film were measured by means of a vibrating sample magnetometer, a vector impedance meter, a B-H curve tracer and a torque meter, respectively. Further, the corrosion resistance of each magnetic film was determined from a reduction in saturation magnetic flux density caused by maintaining each magnetic film at 30° C. for seven days while spraying each magnetic film with a 1 percent solution of NaCl. In more detail, when the saturation magnetic flux density measured before the spray of the 1 percent NaCl solution is expressed by $\sigma_o$ and the saturation magnetic flux density obtained after the spray of the 1 percent NaCl solution for seven days is expressed by $\sigma$, the corrosion resistance is given by $(\sigma/\sigma_o) \times 100$ percent.

Figure 1:
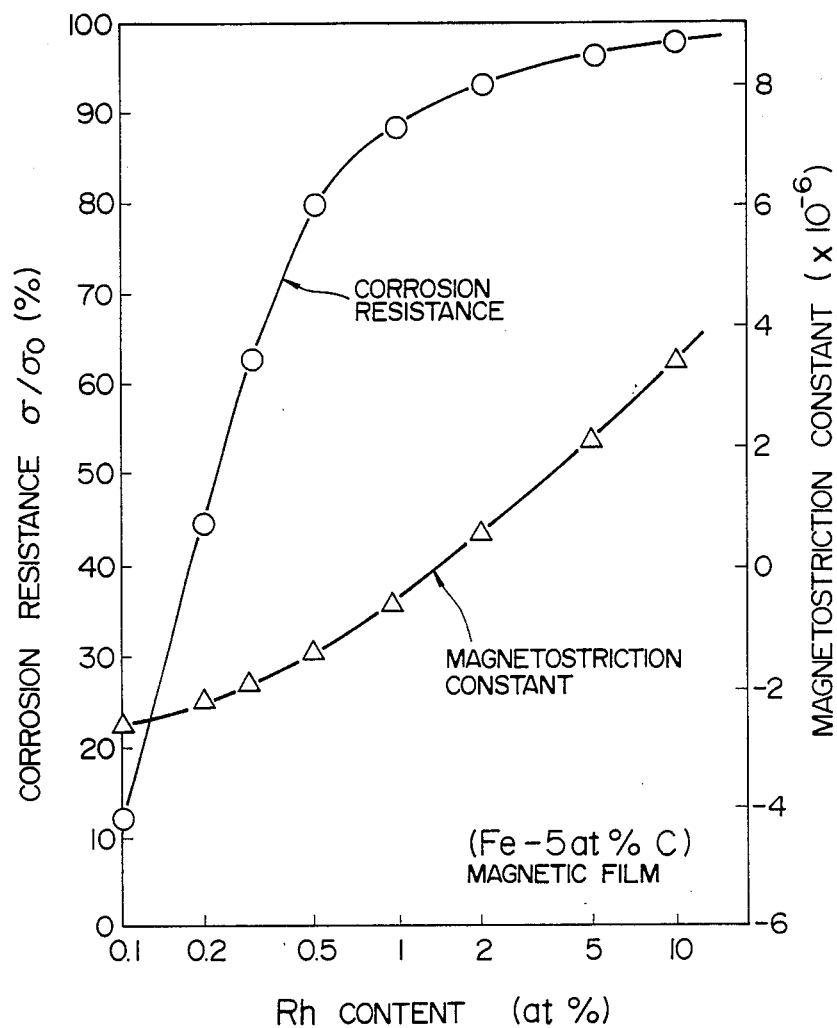
FIG. 1 is a graph showing the influence of rhodium content on the corrosion resistance and magnetostriction constant of a magnetic film which is made of iron containing 5 atomic % carbon and further contains rhodium.

The results of measurement are shown in Table 1. Further, FIG. 1 shows a change in corrosion resistance and magnetostriction constant of a magnetic film which is made of iron containing 5 atomic percent carbon, caused by adding rhodium (Rh) to the magnetic film.

TABLE 1

| Magnetic film | Additive (1.5 atomic percent) | Saturation magnetic flux density (KG) | Relative permeability | Coercivity (Oe) | Magnetostriction constant (×10$^{-6}$) | Corrosion resistance $\sigma/\sigma_o$ (%) |
|---|---|---|---|---|---|---|
| Fe-5 at % C | | 20.7 | 730 | 4.2 | −2.6 | 12 |
| Fe-8 at % C | | 21.3 | 810 | 3.9 | −1.2 | 8 |
| " | Ni | 20.3 | 620 | 3.6 | −0.7 | 86 |
| " | Rh | 21.1 | 690 | 4.1 | 0.3 | 91 |
| " | Ru | 19.8 | 720 | 4.3 | 1.2 | 89 |
| " | Pd | 20.4 | 540 | 3.8 | −1.1 | 93 |
| " | Zr | 20.2 | 590 | 3.7 | −0.6 | 91 |
| " | Ag | 20.3 | 630 | 4.3 | −0.5 | 88 |
| " | Os | 20.1 | 710 | 3.9 | 0.6 | 83 |
| " | Ir | 19.7 | 820 | 3.4 | 0.3 | 85 |
| " | Pt | 20.5 | 760 | 3.7 | 1.3 | 92 |
| " | Au | 19.9 | 660 | 4.5 | 1.1 | 95 |
| " | Cr | 19.6 | 580 | 4.6 | −0.9 | 87 |
| " | Mo | 20.1 | 640 | 4.1 | −0.2 | 86 |
| " | W | 19.5 | 720 | 3.9 | 0.3 | 90 |
| " | Ti | 20.8 | 730 | 4.6 | 0.5 | 89 |

TABLE 1-continued

| Magnetic film | Additive (1.5 atomic percent) | Saturation magnetic flux density (KG) | Relative permeability | Coercivity (Oe) | Magnetostriction constant ($\times 10^{-6}$) | Corrosion resistance $\sigma/\sigma_o$ (%) |
|---|---|---|---|---|---|---|
| " | Nb | 20.4 | 830 | 4.8 | 0.8 | 85 |
| " | Ta | 19.8 | 640 | 3.8 | 1.5 | 94 |
| " | Ru + Ti | 20.2 | 710 | 4.2 | 1.7 | 91 |
| " | Ni + Cr | 19.7 | 680 | 4.0 | 0.8 | 90 |
| " | Bi | 19.8 | 720 | 4.4 | 1.2 | 93 |
| " | V | 20.1 | 730 | 4.1 | 0.9 | 86 |
| " | Co | 20.6 | 750 | 4.0 | 0.7 | 92 |
| " | Cu | 20.4 | 740 | 4.2 | 0.9 | 96 |

As is apparent from Table 1, when at least one element selected from Ni, Rh, Ru, Pd, Zr, Nb, Ta, Ag, Os, Ir, Pt, Au, Cr, Mo, W, Ti, Bi, V, Co and Cu is added to a magnetic film which is made of iron containing 8 atomic percent carbon, the corrosion resistance of the magnetic film is improved. Further, as shown in FIG. 1, the corrosion resistance of a magnetic film which is made of iron containing 5 atomic percent carbon and further contains rhodium (Rh), increases as the Rh content is larger, and the magnetostriction constant of the magnetic film increases from a negative value to a positive value in accordance with the increase of the Rh content. Thus, when the Rh content lies in a range from 0.5 to 5 atomic percent, the corrosion resistance is greater than 80%, and the absolute value of the magnetostriction constant is less than $2 \times 10^{-6}$. Further, it has been confirmed that other additives shown in Table 1 than rhodium can produce the same effect as rhodium and it is preferred to add at least one of these additives to the magnetic film at a concentration value of 0.5 to 5 atomic percent.

The Fe-C magnetic films thus formed were measured by the X-ray diffraction method, and a diffraction line from the (110) plane of α-iron was observed. Thus, it was confirmed that each of the magnetic films was crystallized and had a surface parallel to the (110) crystallographic plane.

EXAMPLE 2

Elements interstitially soluble to iron other than carbon were used for forming magnetic films as shown in Table 2, and further a third element such as nickel was added to the magnetic films to improve the corrosion resistance thereof.

The magnetic characteristics and corrosion resistance of magnetic films which were formed in the above-mentioned manner and had a thickness of 0.5 to 1 μm, are shown in Table 2.

TABLE 2

| Magnetic film | Additive (1.5 atomic percent) | Saturation magnetic flux density (KG) | Relative permeability | Coercivity (Oe) | Magnetostriction constant ($\times 10^{-6}$) | Corrosion resistance $\sigma/\sigma_o$ (%) |
|---|---|---|---|---|---|---|
| Fe | Ni | 20.5 | 220 | 10.5 | −1.1 | 92 |
| " | Rh | 20.9 | 190 | 11.1 | −0.7 | 89 |
| Fe-5 at % B | Ni | 19.6 | 720 | 4.3 | 1.5 | 86 |
| " | Ru | 19.9 | 830 | 4.6 | 0.6 | 93 |
| Fe-8 at % B | Rh | 20.5 | 760 | 4.0 | −0.8 | 91 |
| " | Pd | 20.8 | 810 | 4.4 | −0.9 | 94 |
| Fe-5 at % P | Ag | 20.3 | 530 | 4.5 | 1.3 | 87 |
| " | Cr | 19.7 | 590 | 4.2 | 1.0 | 85 |
| Fe-8 at % P | Au | 19.4 | 620 | 4.7 | 1.2 | 84 |
| " | Mo | 20.2 | 580 | 3.6 | 0.9 | 91 |
| Fe-5 at % N | Ti | 20.8 | 930 | 3.1 | −0.9 | 90 |
| " | Ir | 19.4 | 970 | 2.9 | −1.1 | 88 |
| Fe-8 at % N | W | 19.7 | 850 | 3.4 | −0.4 | 87 |
| " | Ta | 20.0 | 940 | 2.8 | 1.2 | 82 |
| Fe-5 at % (B, N) | Rh | 19.7 | 670 | 4.4 | 1.5 | 93 |
| Fe-5 at % (B, N) | Pd | 19.4 | 730 | 4.0 | 0.6 | 94 |
| Fe-5 at % (B, P) | Mo | 20.3 | 720 | 4.8 | 0.9 | 86 |
| Fe-5 at % (B, P) | Os | 20.9 | 790 | 4.6 | 1.0 | 81 |
| Fe-5 at % (B, C) | Ni | 20.4 | 660 | 4.5 | 0.8 | 85 |
| Fe-5 at % (B, C) | Ru | 20.6 | 680 | 4.3 | 0.5 | 90 |
| Fe-5 at % (B, C) | Cu | 20.3 | 720 | 4.4 | 0.4 | 93 |

As is apparent from Table 2, in a case where an element interstitially soluble to iron other than carbon is added to a magnetic film made of iron, the permeability of the magnetic film is increased and the magnetic film exhibits favorable soft magnetic characteristics, as in a case where carbon is added to the magnetic film. Further, when an element selected from Ni, Rh, Ru, Pd, Zr, Nb, Ta, Ag, Os, Ir, Pt, Au, Cr, Mo, W, Ti and Cu is added to the magnetic film, the corrosion resistance of the magnetic film is improved. However, as in Example 1, the magnetostriction constant of the magnetic film increases as the amount of an element added to improve The magnetic characteristics of multi-layered magnetic films thus obtained are shown in Table 3.

TABLE 3

| Main magnetic film | | Intermediate layer | Saturation magnetic flux density (KG) | Relative permeability | Coercivity (Oe) | Magnetostriction constant ($\times 10^{-6}$) | Corrosion resistance $\sigma/\sigma_0$ (%) |
|---|---|---|---|---|---|---|---|
| Magnetic film | Additive | | | | | | |
| Fe-5 at % C | 1.5 at % Ni | Ni-19 wt. % Fe | 19.8 | 2010 | 0.6 | 0.8 | 96 |
| " | 1.5 at % Rh | " | 19.5 | 1980 | 0.9 | 0.5 | 99 |
| " | 1.5 at % Ru | " | 20.3 | 2030 | 0.7 | 1.2 | 97 |
| " | 1.5 at % Pd | " | 20.0 | 2240 | 0.8 | 1.5 | 95 |
| " | 1.5 at % Ag | Co-7 wt. % Zr | 19.7 | 1870 | 1.0 | 0.9 | 87 |
| Fe-5 at % B | 1.5 at % Ni | Ni-19 wt. % Fe | 20.4 | 1930 | 1.0 | 1.3 | 94 |
| " | 1.5 at % Au | " | 20.2 | 1860 | 0.8 | 1.9 | 96 |
| " | 1.5 at % Mo | " | 19.9 | 1850 | 0.7 | 1.6 | 95 |
| " | 1.5 at % Ti | " | 19.4 | 1920 | 0.9 | 0.8 | 93 |
| " | 1.5 at % Ir | Co-7 wt. % Zr | 19.8 | 1870 | 0.8 | 0.9 | 85 |
| " | 1.5 at % Bi | Ni-19 wt. % Fe | 19.6 | 1960 | 0.7 | 1.1 | 87 |
| " | 1.5 at % V | " | 19.4 | 2010 | 0.7 | 1.3 | 91 |
| " | 1.5 at % Co | " | 20.2 | 2100 | 0.6 | 1.0 | 94 |
| " | 1.5 at % Cu | " | 19.8 | 1980 | 0.5 | 0.7 | 96 |
| Fe-5 at % N | 1.5 at % W | " | 19.7 | 1850 | 0.7 | -0.3 | 93 |
| " | 1.5 at % Ta | " | 19.5 | 2320 | 0.9 | -0.7 | 95 |
| " | 1.5 at % Rh | " | 20.3 | 2430 | 0.9 | 0.9 | 96 |
| " | 1.5 at % Nb | " | 20.1 | 1950 | 0.8 | 1.2 | 99 |
| " | 1.5 at % Ru | Co-7 wt. % Zr | 19.6 | 1980 | 1.0 | -0.5 | 90 |
| Fe-5 at % P | 1.5 at % Ni | Ni-19 wt. % Fe | 19.8 | 1660 | 0.9 | 1.6 | 97 |
| " | 1.5 at % Cr | " | 19.5 | 1940 | 0.8 | 1.4 | 97 |
| " | 1.5 at % Ru | " | 19.7 | 1890 | 0.7 | 1.7 | 93 |
| " | 1.5 at % Zr | " | 20.1 | 1770 | 0.9 | 1.3 | 94 |
| " | 1.5 at % Pt | Co-7 wt. % Zr | 19.9 | 1730 | 1.0 | 1.0 | 89 | corrosion resistance is increased. In order to form a magnetic film which is excellent in corrosion resistance and has a magnetostriction constant whose absolute value is very small, it is preferred to add an element for improving corrosion resistance to the magnetic film at a concentration value of 0.5 to 5 atomic percent.

When elements interstitially soluble to iron such as C, B, N and P are added to a magnetic film containing iron as its main component, at a concentration value greater than 15 atomic percent, the corrosion resistance of the magnetic film is abruptly decreased. In this case, even when an element for improving corrosion resistance, for example, Ni or Rh is added to the magnetic film, it is impossible to improve the corrosion resistance of the magnetic film. Thus, in order to form a magnetic film which is high in corrosion resistance, it is necessary to add an element interstitially soluble to iron, to the magnetic film at a concentration value less than or equal to 15 atomic percent. Meanwhile, in order to increase the permeability of the magnetic film, it is necessary for the magnetic film to contain the above element at a concentration value greater than or equal to 1 atomic percent.

EXAMPLE 3

A target containing iron as its main component and used in Example 1 was held by one target holder of an ion beam sputtering apparatus having rotary target holders, and a Ni-19 wt. % Fe target or Co-7 wt. % Zr target was held by another target holder. Under the same sputtering conditions as in Example 1, a magnetic film containing iron as its main component was deposited to a thickness of 460 Å, to be used as a main magnetic film, and a Ni-19 wt. % Fe film or Co-7 wt. % Zr film was deposited to a thickness of 40 Å, to be used as an intermediate layer. The main magnetic film and the intermediate layer were alternately deposited to form a multi-layered magnetic film having 19 films and layers.

As can be seen from Table 3, the multilayered magnetic films are far greater in permeability than the single-layer magnetic films, that is, have a relative permeability greater than 1,500. It is supposed that the high permeability of a multi-layered magnetic film is based upon the following phenomenon. That is, when a magnetic film having a multi-layered structure is formed, columnar crystal grains are divided into fine grains by the inserted intermediate layer, and thus decreasing the dispersion of magnetic anisotropy.

The corrosion resistance of the multi-layered magnetic films was similar to that of the single-layer magnetic films shown in Examples 1 and 2. However, as can be seen from Table 3, the multi-layered magnetic films having the Ni-19 wt. % Fe film as the intermediate layer were superior in corrosion resistance to the multi-layered magnetic films having the Co-7 wt. % Zr film as the intermediate layer.

Figure 2:
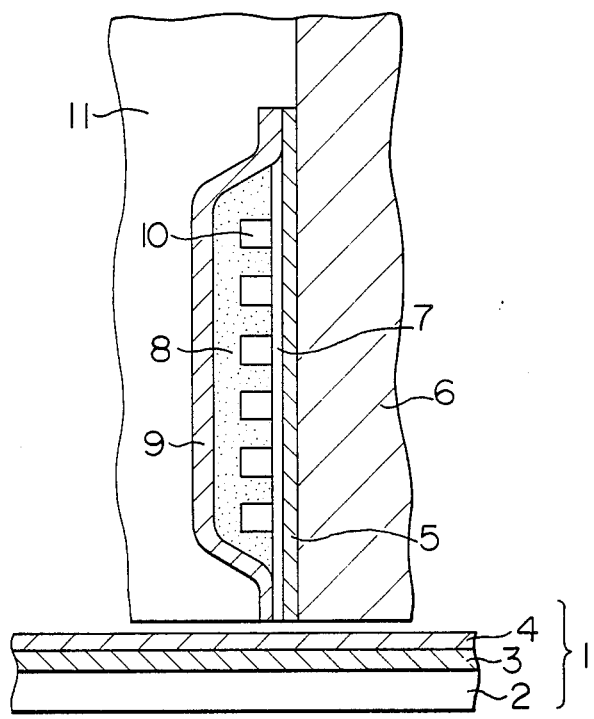
FIG. 2 is a sectional view showing an embodiment of a magnetic head which uses a magnetic film according to the present invention as a main magnetic pole.

The above-mentioned single-layer film or multi-layered film was used for forming the main magnetic pole of a perpendicular magnetic recording head which is shown in FIG. 2.

Referring to FIG. 2, a magnetic recording medium 1 is made up of a non-magnetic substrate 2, a base film 3 such as permalloy formed on the substrate 2, and a perpendicularly magnetizable film 4 formed on the base film 3 and having an easy magnetization axis perpendicular to the film 4. The film 4 is made of a Co-Cr alloy. Further, a magnetic head is made up of a main magnetic pole 5 formed on a substrate 6, a gap limiting material 7, an auxiliary magnetic pole 9, a coil 10, a packing member 8 made of an insulating material, and a protective film 11 formed on the auxiliary magnetic pole 9. The main magnetic pole 5 is magnetized by a signal current flowing through the coil 10 to generate a perpendicular magnetic field at the tip of the pole 5, thereby recording a signal in the perpendicularly magnetizable film 4 of the magnetic recording medium 1.

With the magnetic head using a single-layer magnetic film according to the present invention as the main magnetic pole, a recording density greater than or equal to 100 KBPI (kilobit per inch) was obtained. This value is larger than 80 KBPI obtained by a conventional magnetic head. Further, with a magnetic head using a multi-layered magnetic film according to the present invention as the main magnetic pole, a recording density greater than or equal to 120 KBPI was obtained.

In Examples 1, 2 and 3, magnetic films are formed by the ion beam sputtering method, and the characteristics of the magnetic films are shown. Further, the present inventors formed similar magnetic films by the RF sputtering method, and studied the magnetic films. Thus, it was confirmed that the magnetic films were able to have the same magnetic characteristics and corrosion resistance as obtained by the ion beam sputtering method, only by keeping the substrate temperature at about 200° C. That is, a magnetic film according to the present invention can be produced, independently of the film forming method.

As has been explained in the foregoing, according to the present invention, a magnetic film containing iron as its main component can have a high saturation magnetic flux density of 18 KG or more, a high relative permeability of 500 or more for a single layer structure, and 1,500 or more for a multi-layered structure, a low coercivity of 50 Oe or less for a single layer structure and 10 Oe or less for a multilayered structure, a small magnetostriction constant whose absolute value is less than or equal to $2 \times 10^{-6}$, and a strong corrosion resistance value ($\sigma/\sigma_o$) of 0.8 or more. In a case where a magnetic film according to the present invention is used as the magnetic pole of magnetic head, even when the magnetic film has a thickness of about 0.2 μm, a strong magnetic field can be formed at the tip of the magnetic pole, without generating magnetic saturation in the magnetic film. Thus, ultra-high density magnetic recording can be carried out.

The reason why a magnetic film according to the present invention has such excellent characteristics, is not clear. However, the excellent characteristics are considered to be based upon the following phenomena. That is, when an element interstitially soluble to iron is added to iron, the element does not dilute the magnetic moment of iron, but prevents the growth of crystal grain. Further, even when an element for improving corrosion resistance is contained in a magnetic film at a very low concentration value, the corrosion resistance of the magnetic film is clearly improved That is, the above elements added to iron are considered to exhibit respective effects.

The reason why a multi-layered structure improves the soft magnetic characteristics of a magnetic film, is not clear. However, it is supposed that when a multi-layered magnetic film is formed, the crystal grains in a single layered film are divided into fine grains, by the insertion of an intermediate layer and the formation of fine crystal grains is related to an improvement in soft magnetic characteristics.

We claim:

1. A ferromagnetic film made of a crystalline ferromagnetic material, the crystalline ferromagnetic material containing an element interstitially soluble to iron to improve the soft magnetic characteristics of the magnetic film, in addition to iron used as a main component, wherein the magnetic material further contains at least one element selected from the group consisting of Ni, Rh, Ru, Pd, Zr, Nb, Ta, Ag, Os, Ir, Pt, Au, Cr, Mo, W, Ti, Bi, V, Co and Cu, at a concentration value of 0.5 to 5 atomic percent of improve the corrosion resistance of the magnetic film without degrading the soft magnetic characteristics of the film.

2. A ferromagnetic film according to claim 1, wherein the element interstitially soluble to iron is at least one element selected from the group consisting of B, C, N and P, and is contained in the crystalline ferromagnetic material at a concentration value of 1 to 15 atomic percent.

3. A multi-layered ferromagnetic film formed by depositing a main magnetic film and an intermediate film alternately, wherein the main magnetic film is formed of an anti-corrosion ferromagnetic film made of a crystalline ferromagnetic material containing an element interstitially soluble to iron to improve the soft magnetic characteristics of the magnetic film, in addition to iron used as a main component, and further containing at least one element selected from the group consisting of Ni, Rh, Ru, Pd, Zr, Nb, Ta, Ag, Os, Ir, Pt, Au, Cr, Mo, W, Ti, Bi, V, Co and Cu at a concentration value of 0.5 to 5 atomic percent to improve the corrosion resistance of the magnetic film without degrading the soft magnetic characteristics of the film, and the intermediate film is formed of a metal film different from the main magnetic film.

4. A magnetic head, wherein at least a portion of a magnetic pole is formed of a ferromagnetic film made of a crystalline ferromagnetic material which contains an element interstitially soluble to iron to improve the soft magnetic characteristics of the magnetic film, in addition to iron used as a main component, and further contains at least one element selected from the group consisting of Ni, R, Ru, Pd, Zr, Nb, Ta, Ag, Os, Ir, Pt, Au, Cr, Mo, W, Ti, Bi, V, Co and Cu at a concentration value of 0.5 to 5 atomic percent to improve the corrosion resistance of the magnetic film without degrading the soft magnetic characteristics of the film.

5. A magnetic head according to claim 4, wherein the element interstitially soluble to iron is at least one element selected from the group consisting of B, C, N and P, and is contained in the crystalline ferromagnetic material at a concentration value of 1 to 15 atomic percent.

6. A magnetic head, wherein at least a portion of a magnetic pole is formed of a multi-layered ferromagnetic film made by depositing a main magnetic film and an intermediate film alternately, the main magnetic film is formed of an anti-corrosion ferromagnetic film made of a crystalline ferromagnetic material which contains an element interstitially soluble to iron to improve the soft magnetic characteristics of the magnetic film, in addition to iron used as a main component, and further contains at least one element selected from the group consisting of Ni, Rn, Ru, Pd, Zr, Nb, Ta, Ag, Os, Ir, Pt, Au, Cr, Mo, W, Ti, Bi, V, Co and Cu at a concentration value of 0.5 to 5 atomic percent to improve the corrosion resistance of the magnetic film without degrading the soft magnetic characteristics of the film, and the intermediate film is formed of a metal film different from the main magnetic film.

7. A magnetic head according to claim 6, wherein the element interstitially soluble to iron is at least one element selected from the group consisting of B, C, N and P, and is contained in the crystalline ferromagnetic material at a concentration value of 1 to 15 atomic percent.

* * * * *